United States Patent
Cozzo et al.

(10) Patent No.: US 10,321,413 B2
(45) Date of Patent: *Jun. 11, 2019

(54) SYSTEM AND METHOD FOR TRANSMIT POWER CONTROL WITH SECONDARY UPLINK PILOT CHANNEL

(71) Applicant: Futurewei Technologies, Inc., Plano, TX (US)

(72) Inventors: Carmela Cozzo, San Diego, CA (US); Peng Zhang, Shanghai (CN); Xiaolei Tie, Shanghai (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,079

(22) Filed: Jan. 22, 2018

(65) Prior Publication Data

US 2018/0146437 A1 May 24, 2018

Related U.S. Application Data

(63) Continuation of application No. 14/803,874, filed on Jul. 20, 2015, now Pat. No. 9,877,288.

(Continued)

(51) Int. Cl.
*H04W 4/00* (2018.01)
*H04W 52/24* (2009.01)
(Continued)

(52) U.S. Cl.
CPC ......... *H04W 52/244* (2013.01); *H04L 5/0048* (2013.01); *H04L 25/0202* (2013.01);
(Continued)

(58) Field of Classification Search
CPC ............. H04L 25/0202; H04L 5/0048; H04W 52/146; H04W 52/16; H04W 52/244;
(Continued)

(56) References Cited

U.S. PATENT DOCUMENTS

| 9,877,288 B2* | 1/2018 | Cozzo | H04W 56/00 |
| 2010/0208682 A1* | 8/2010 | Ranta-Aho | H04W 76/028 370/329 |

(Continued)

FOREIGN PATENT DOCUMENTS

| CN | 103716868 A | 4/2014 |
| CN | 103945416 A | 7/2014 |

(Continued)

OTHER PUBLICATIONS

3rd Generation Partnership Project; Technical Specification Group Radio Access Network; Physical layer procedures (FDD); (Release 12), 3GPP TS 25.214 v12.1.0, Technical Specification, Sections 4.3.1, 5.1.2, 5.2.1, 5.2.1.1 and 5.3.2.6, Dec. 2014, 137 pages.

(Continued)

*Primary Examiner* — Minh Trang T Nguyen
(74) *Attorney, Agent, or Firm* — Slater Matsil, LLP

(57) ABSTRACT

A method for operating a user equipment (UE) configured for estimating channel quality includes receiving a downlink fractional control channel from a non-serving HS-DSCH cell, estimating a quality of the downlink fractional control channel over a specified time period, and deriving downlink synchronization primitives in accordance with the quality of the downlink fractional control channel. Further methods for deriving the transmit power of an uplink control channel from downlink fractional control channels transmitted by the serving and non-serving HS-DSCH cells are disclosed.

23 Claims, 11 Drawing Sheets

Related U.S. Application Data

(60) Provisional application No. 62/029,268, filed on Jul. 25, 2014.

(51) Int. Cl.

| | | |
|---|---|---|
| *H04L 5/00* | (2006.01) | |
| *H04L 25/02* | (2006.01) | |
| *H04W 52/16* | (2009.01) | |
| *H04W 74/00* | (2009.01) | |
| *H04W 56/00* | (2009.01) | |
| *H04W 52/14* | (2009.01) | |
| *H04W 52/32* | (2009.01) | |
| *H04W 52/40* | (2009.01) | |
| *H04W 88/02* | (2009.01) | |
| *H04W 88/08* | (2009.01) | |

(52) U.S. Cl.
CPC ......... *H04W 52/146* (2013.01); *H04W 52/16* (2013.01); *H04W 52/247* (2013.01); *H04W 52/248* (2013.01); *H04W 52/325* (2013.01); *H04W 52/40* (2013.01); *H04W 56/00* (2013.01); *H04W 74/002* (2013.01); *H04W 88/02* (2013.01); *H04W 88/08* (2013.01)

(58) Field of Classification Search
CPC ............. H04W 52/247; H04W 52/248; H04W 52/325; H04W 52/40; H04W 56/00; H04W 74/002; H04W 88/02; H04W 88/08

See application file for complete search history.

(56) References Cited

U.S. PATENT DOCUMENTS

| | | |
|---|---|---|
| 2013/0034092 A1 | 2/2013 | Lampinen et al. |
| 2013/0201947 A1 | 8/2013 | Wong |
| 2014/0126534 A1 | 5/2014 | Larsson et al. |
| 2014/0211694 A1 | 7/2014 | He et al. |
| 2016/0249298 A1 | 8/2016 | Larsson et al. |

FOREIGN PATENT DOCUMENTS

| | | |
|---|---|---|
| EP | 2418896 A1 | 2/2012 |
| EP | 2713525 A1 | 4/2014 |
| WO | 2012050506 A1 | 4/2012 |
| WO | 2012112868 A1 | 8/2012 |

OTHER PUBLICATIONS

"LS on Progress in RA1 #77 for the UMTS Heterogeneous Networks Enhancements WI," 3GPP TSG RAN WG3 Meeting #84, R3-141492, Seoul, Korea, May 19-23, 2014, 1 pages.

Nokia Siemens Networks, "Multiflow and DL out-of-sync handling," 3GPP TSG RAN WG1 Meeting #70, R1-123720, Qingdao, P.R. China, Aug. 13-17, 2012, 3 pages.

NSN, "Further considerations for E-DCH decoupling feature specification," 3GPP TSG-RAN WG2 Meeting #85bis, R2-141072, Valencia, Spain, Mar. 31-Apr. 4, 2014, 7 pages.

RAN WG1, "LS on Progress in RAN1 #77 for the UMTS Heterogeneous Networks Enhancements WI," 3GPP TSG RAN WG1 Meeting #77, R1-142618, Seoul, Korea, May 19-23, 2014, 1 page.

\* cited by examiner

SYSTEM AND METHOD FOR TRANSMIT POWER CONTROL WITH SECONDARY UPLINK PILOT CHANNEL

CROSS-REFERENCE TO RELATED APPLICATIONS

This application is a continuation of U.S. patent application Ser. No. 14/803,874, filed on Jul. 20, 2015, entitled "System and Method for Transmit Power Control with Secondary Uplink Pilot Channel", which claims the benefit of U.S. Provisional Application No. 62/029,268, filed on Jul. 25, 2014, entitled "System and Method for Transmit Power Control with Secondary Uplink Pilot Channel," all of which applications are hereby incorporated herein by reference.

TECHNICAL FIELD

The present disclosure relates generally to digital communications, and more particularly to a system and method for transmit power control with secondary uplink pilot channel.

BACKGROUND

The deployment of heterogeneous networks (Hetnets), which are mixed deployments of high power NodeBs (macro node) and low power nodes (LPNs), aims at increasing network capacity and coverage. The difference in transmit power between the macro node and the LPN causes different coverage areas for the UL and the DL.

Considering a soft handover region between a macro and an LPN, the macro node, being the more dominant node, is more likely to be the serving node. However, the signal received at the LPN can be much stronger than the signal received at the macro node. Considering the received signal to noise ratio (SNR) of the pilot channel in the uplink (UL), since both the macro node and the LPN can control the transmit power level of the user equipment (UE), the transmit power of the UE is largely driven by the LPN. As a consequence, the high speed-dedicated physical control channel (HS-DPCCH) that carries the hybrid automatic repeat request acknowledgement (HARQ-ACK) and channel quality indicator (CQI) may not be reliably decoded at the serving macro node. In this scenario, unreliable HARQ-ACK decoding, especially high ACK to discontinuous transmission (DTX) error, causes unnecessary retransmissions and degrades the downlink (DL) throughput performance.

SUMMARY

Example embodiments provide a system and method for transmit power control with secondary uplink pilot channel.

In accordance with an example embodiment, a method is provided for operating a user equipment (UE) configured for estimating channel quality. The method includes receiving, by the UE, a downlink fractional control channel from a non-serving cell, estimating, by the UE, a quality of the downlink fractional control channel over a specified time period, and deriving, by the UE, downlink synchronization primitives in accordance with the quality of the downlink fractional control channel.

In accordance with another example embodiment, a method is provided for operating a user equipment (UE) configured for performing transmit power control (TPC). The method includes receiving, by the UE, a first downlink fractional control channel from a serving high-speed downlink shared channel (HS-DSCH) cell and a downlink fractional control channel from a non-serving HS-DSCH cell, and determining, by the UE, a transmit power of an uplink dedicated physical control channel (DPCCH) in accordance with TPC fields in the downlink fractional control channel from the non-serving HS-DSCH cell.

In accordance with an example embodiment, a method is provided for operating a user equipment (UE) configured for performing transmit power control (TPC). The method includes determining, by the UE, a transmit power of an uplink dedicated physical control channel (DPCCH) in accordance with a first combination of TPC fields from at least one of a first downlink fractional control channel from a serving high-speed downlink shared channel (HS-DSCH) cell, a second downlink fractional control channel from the serving HS-DSCH cell, and a downlink fractional control channel from a non-serving HS-DSCH cell, receiving, by the UE, signaling indicating a switch in how the transmit power of the DPCCH is determined, and determining, by the UE, the transmit power of the DPCCH in accordance with a second combination of the TPC fields from at least one of the first downlink fractional control channel from the serving HS-DSCH cell, the second downlink fractional control channel from the serving HS-DSCH cell, and the downlink fractional control channel from the non-serving HS-DSCH cell.

In accordance with an example embodiment, a user equipment (UE) is provided to estimate channel quality. The UE includes a processor, and a computer readable storage medium coupled to the processor and storing programming for execution by the processor. The programming includes instructions configuring the UE to receive a downlink fractional control channel from a non-serving cell, estimate a quality of the downlink fractional control channel over a specified time period, and derive downlink synchronization primitives in accordance with the quality of the downlink fractional control channel.

In accordance with an example embodiment, a user equipment (UE) is provided to perform transmit power control (TPC). The UE includes a processor, and a computer readable coupled to the processor and storage medium storing programming for execution by the processor. The programming includes instructions configuring the UE to receive a first downlink fractional control channel from a serving high-speed downlink shared channel (HS-DSCH) cell and a downlink fractional control channel from a non-serving HS-DSCH cell, and determine a transmit power of an uplink dedicated physical control channel (DPCCH) in accordance with TPC fields in the downlink fractional control channel from the non-serving HS-DSCH cell.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the embodiments disclosed herein, and do not limit the scope of the disclosure.

One embodiment relates to transmit power control with secondary uplink pilot channel. For example, a UE receives a downlink fractional control channel transmitted by a non-serving cell, estimates a quality of the downlink fractional control channel over a specified time period, and derives downlink synchronization primitives in accordance with the estimated quality of the downlink fractional control channel.

The embodiments will be described with respect to example embodiments in a specific context, namely communications systems that perform transmit power control with a secondary uplink pilot channel. The embodiments may be applied to standards compliant communications systems, such as those that are compliant with Third Generation Partnership Project (3GPP), Universal Mobile Telecommunications System (UMTS), IEEE 802.11, and the like, technical standards, and non-standards compliant communications systems, that perform transmit power control with a secondary uplink pilot channel.

Figure 1:
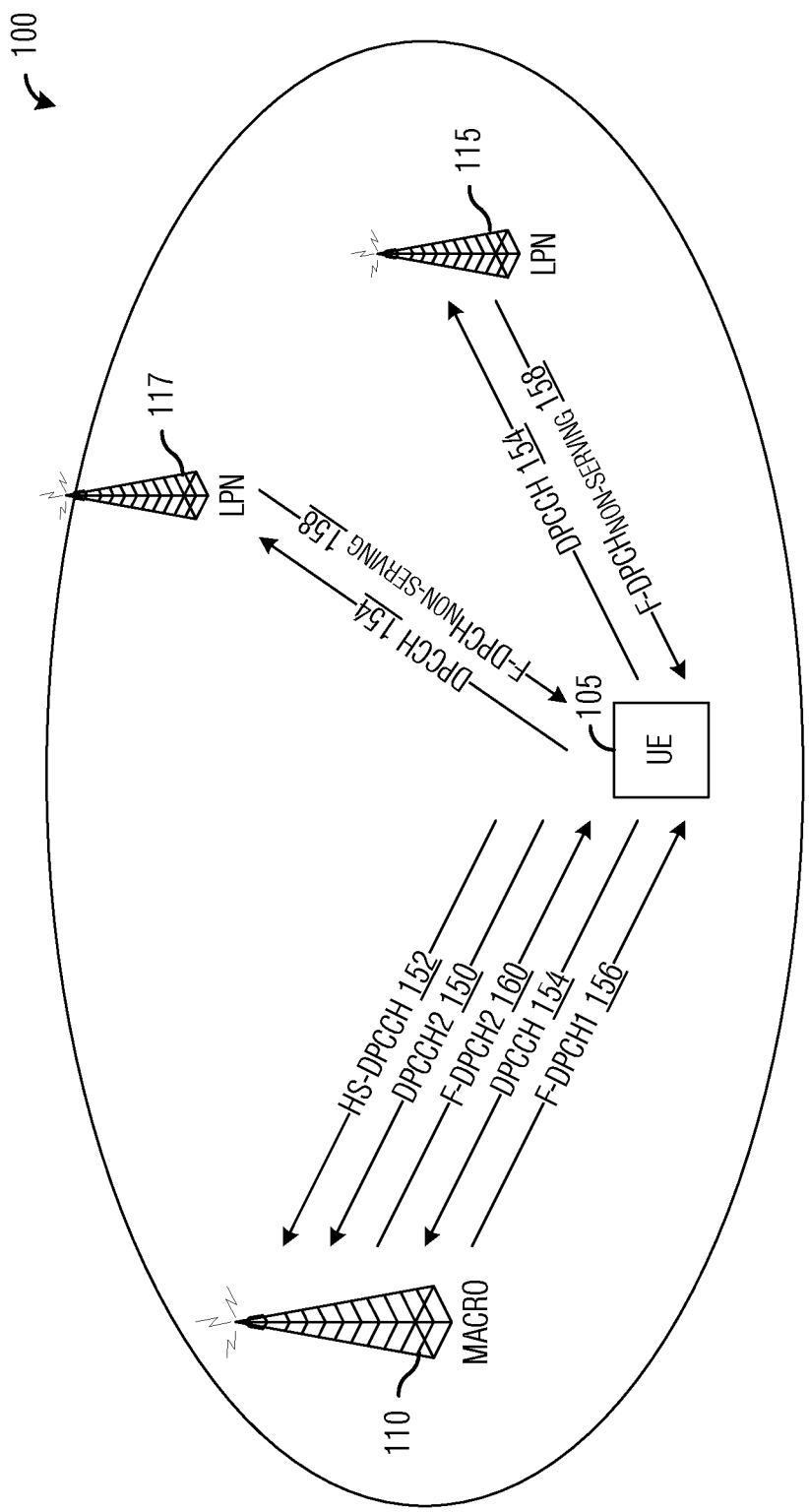
FIG. 1 illustrates an example communications system according to example embodiments described herein.

FIG. 1 illustrates an example communications system 100. Communications system 100 includes a UE 105, a macro node 110, and a plurality of LPNs, such as LPN 115 and LPN 117. In general, a macro node may also be referred to as a base station, a NodeB, an evolved NodeB (eNB), a communications controller, a base terminal station, an access point, a high power node, and so on. Similarly, an LPN may be referred to as a pico cell, a femto cell, a remote radio head (RRH), and so forth, while a UE may be referred to as a mobile station, a mobile, a terminal, a subscriber, a user, etc.

While it is understood that communications systems may employ multiple nodes capable of communicating with a number of UEs, only one macro node, two LPNs, and one UE are illustrated for simplicity.

Also shown in FIG. 1 are control channels exchanged between UE 105, macro node 110, and LPNs 115 and 117. The control channels may include a secondary dedicated physical control channel 2 (DPCCH2) 150 in the UL that serves as a phase reference to assist in estimating a communications channel for demodulating a high speed-downlink shared channel (HS-DPCCH) 152. DPCCCH2 150 is power controlled by macro node 110. A primary pilot channel (DPCCH) 154 in the UL serves as a phase reference to assist in the demodulation of an enhanced DPCCH (E-DPCCH) and enhanced-dedicated physical data channels (E-DPDCHs). The decoding performance of UL data is not affected by the introduction of DPCCCH2 150. DPCCH2 150 carries pilot symbols and transmit power control (TPC) symbols.

The transmit power of DPCCH 154 is controlled by the TPC commands sent by a serving HS-downlink shared channel (HS-DSCH) cell (which is shown in FIG. 1 as macro node 110) as well as non-serving HS-DSCH cells (which are shown in FIG. 1 as LPNs 115 and 117). A non-serving HS-DSCH cell is also referred to as a serving enhanced dedicated channel (E-DCH) cell when E-DCH decoupling is operating.

The TPC commands from the HS-DSCH cell are carried on a fractional dedicated physical channel 1 (F-DPCH1) 156 and TPC commands from a non-serving HS-DSCH cell are carried on F-DPCH$_{NON\text{-}SERVING}$ 158. When there are multiple non-serving HS-DSCH cells, as is shown in FIG. 1, there are multiple F-DPCH$_{NON\text{-}SERVING}$ 158 and the TPC commands carried by each F-DPCH$_{NON\text{-}SERVING}$ 158 are independent.

The transmit power of DPCCCH2 150 is controlled by the TPC commands sent by the serving HS-DSCH cell. The TPC commands from the HS-DSCH cell are carried on F-DPCH2 160. Both F-DPCCH1 156 and F-DPCCH2 160 are sent from the serving HS-DSCH cell and non-colliding resources are used for F-DPCCH1 156 and F-DPCCH2 160. DPCCCH2 150 carries the TPC commands for F-DPCCH1 156 and F-DPCCH2 160. DPCCH 154 carries the TPC commands for at least one of multiple F-DPCH$_{NON\text{-}SERVING}$ 158 transmitted by non-serving HS-DSCHs.

Figure 2:
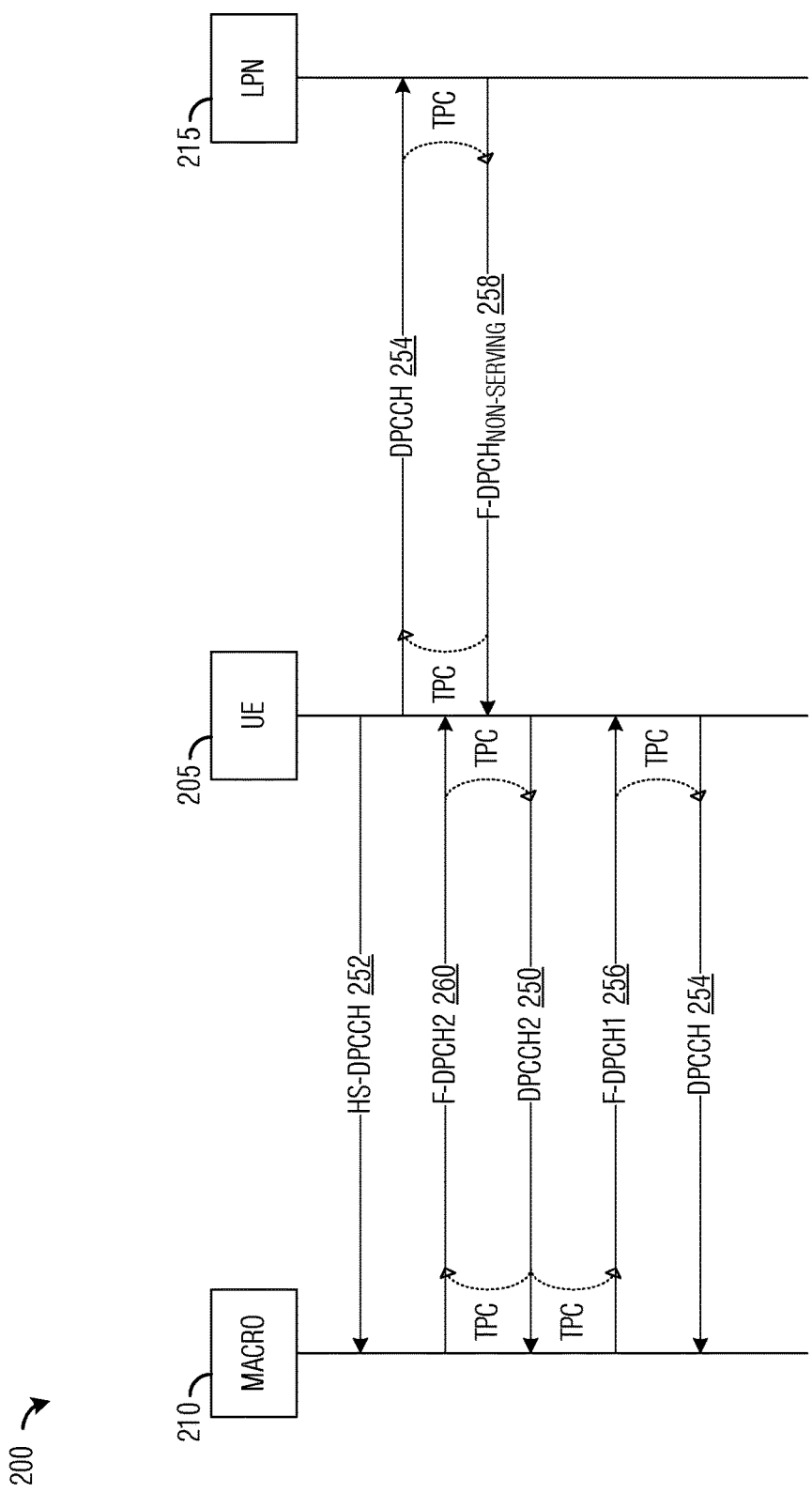
FIG. 2 illustrates a message exchange diagram highlighting power control relationships between control channels according to example embodiments described herein.

FIG. 2 illustrates a message exchange diagram 200 highlighting power control relationships between control channels. Message exchange diagram 200 displays control channels exchanged between a UE 205, a macro node 210, and a LPN 215. A DPCCCH2 250 is used to provide a phase reference for demodulating a HS-DPCCH 252. DPCCCH2 250 includes TPC commands for a F-DPCCH1 256 and a F-DPCCH2 260. F-DPCCH1 256 includes TPC commands for a DPCCH 254. DPCCH 254 includes TPC commands for a F-DPCH$_{NON\text{-}SERVING}$ 258. F-DPCCH1 256 includes TPC commands for DPCCH 254, while F-DPCCH2 260 carries TPC commands for DPCCCH2 250.

A HS-DPCCH consists of a 2-slot channel quality indicator (CQI) and/or precoding control indicator (PCI) field and a 1-slot hybrid automatic repeat requested (HARQ)-acknowledgement (ACK) field. The HARQ-ACK field carries a positive and/or negative acknowledgement (ACK and/or NACK) response for the HS-PDSCH data received at a UE. It is only transmitted after the UE receives the HS-PDSCH data. The CQI and/or PCI field carries the CQI and/or PCI for the downlink channel. The HS-DPCCH is transmitted with a certain transmission cycle that is specified by the communications system or an operator thereof.

During every radio frame (a basic structure for transmitted information in a wireless communications system), UEs check the synchronization status of the F-DPCH1. The synchronization status is indicated to higher layers using CPHY-Sync-IND and CPHY-Out-of-Sync-IND primitives to represent in-sync and out-of-sync status, respectively.

There are several possible criteria for reporting synchronization status. In a first criterion, an in-sync status is reported using the CPHY-Sync-IND primitive if a UE estimates the quality of the TPC fields of the F-DPCCH1 frame received from an associated serving HS-DSCH cell over a specified time period is better than a threshold Qin. In a second criterion, both an in-sync status and an out-of-sync status may be reported. The in-sync status is reported as described for the first criterion, while the out-of-sync status is reported using the CPHY-Out-of-Sync-IND primitive if a UE estimates the quality of the TPC fields of the F-DPCCH1 frame received from an associated serving HS-DSCH cell over a specified time period is worse than a threshold Qout.

Figure 3A:
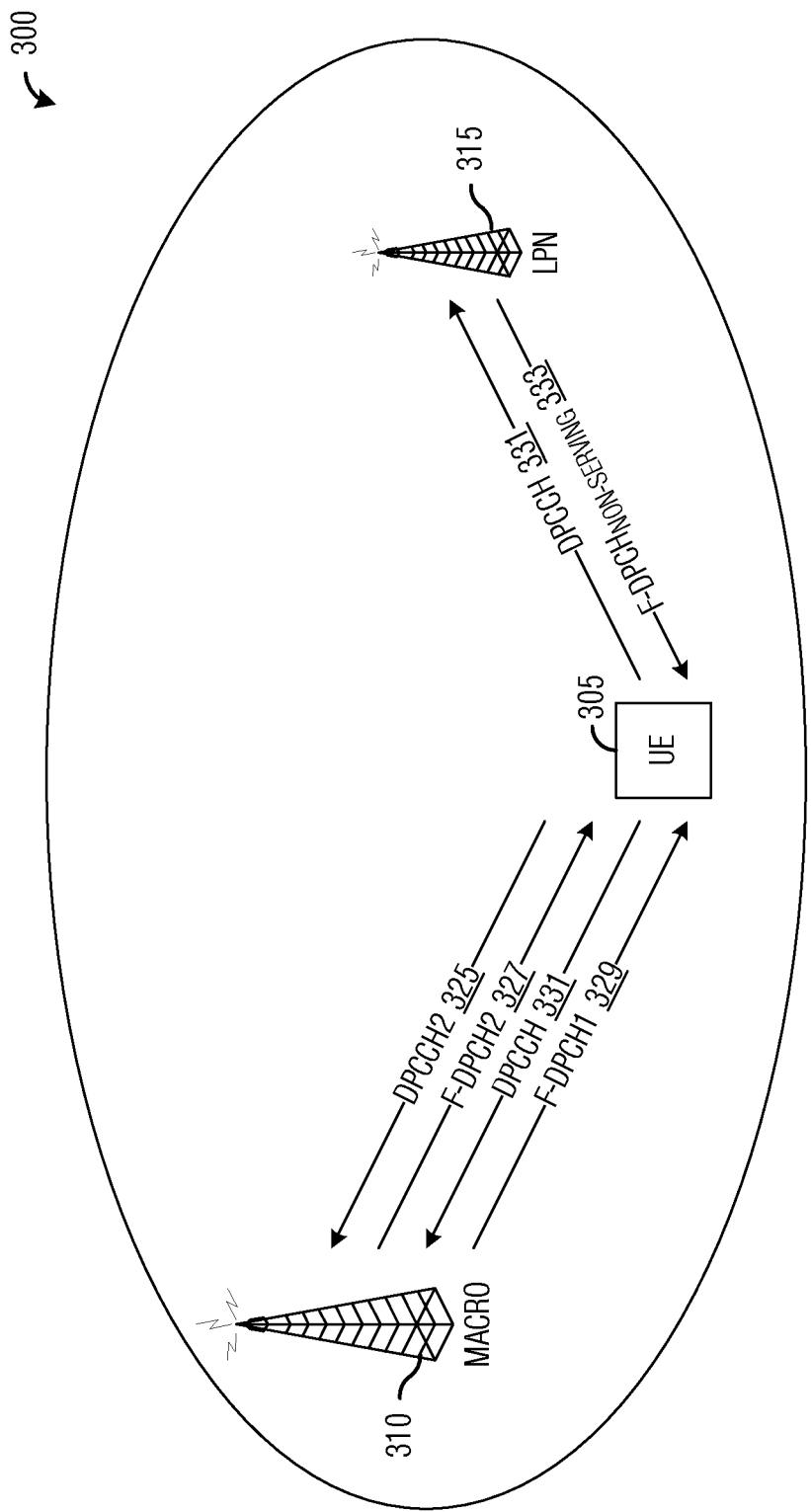
FIG. 3A illustrates a communications system highlighting control signals present in a situation wherein the DPCCCH2 is transmitted continuously according to example embodiments described herein.

FIG. 3A illustrates a communications system 300 highlighting control signals present in a situation wherein the DPCCCH2 is transmitted continuously. Communications system 300 includes a UE 305, a macro node 310, and a LPN 315. As shown in FIG. 3A, macro node 310 is operating as a serving HS-DSCH cell for UE 305 and LPN 315 is operating as a non-serving HS-DSCH cell for UE 305. Control channels include: DPCCCH2 325, F-DPCCH2 327, F-DPCH 329, DPCCH 331, and F-DPCH$_{NON-SERVING}$ 333.

Figure 3B:
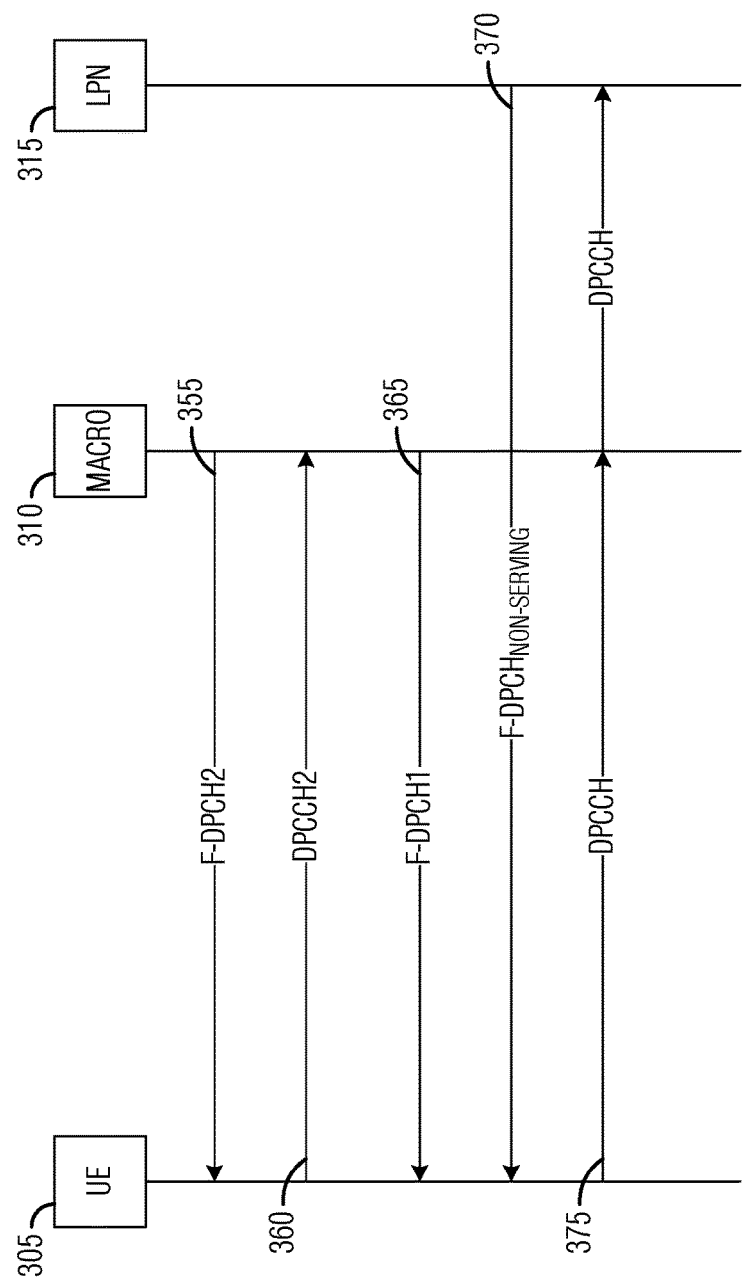
FIG. 3B illustrates a message exchange diagram occurring in a situation wherein the DPCCCH2 is transmitted continuously according to example embodiments described herein.

FIG. 3B illustrates a message exchange diagram 350 occurring in a situation wherein the DPCCCH2 is transmitted continuously. Message exchange diagram 350 displays control channels exchanged between UE 305, macro node 310, and LPN 315.

Generally, the HS-DPCCH transmission is continuous (the HS-DPCCH is transmitted in every transmission time interval (TTI)) and that the DPCCCH2 transmission is also continuous. In such a situation, control channels are exchanged between UE 305, macro node 310, and LPN 315 may include a F-DPCCH2 (shown as event 355), a DPCCCH2 (shown as event 360), a F-DPCCH1 (shown as event 365), a F-DPCH$_{NON-SERVING}$ (shown as event 370), and a DPCCH (shown as event 375).

A summary of the behavior of macro node 310 (operating as the serving HS-DSCH cell) and UE 305 is as follows:
Macro node 310 transmits F-DPCCH1 and F-DPCH2;
UE 305 determines the uplink transmit power of DPCCCH2 according to the TPC command carried on F-DPCCH2 from macro node 310 (serving HS-DSCH cell). UE 305 also determines the uplink transmit power of DPCCH according to a combination of the TPC commands carried on F-DPCCH1 from macro node 310 (serving HS-DSCH cell) and F-DPCH$_{NON-SERVING}$ from LPN 315 (non-serving HS-DSCH cell). UE 305 includes TPC commands in messages 360 (DPCCH2) and 375 (DPCCH).

However, when CQI and/or PCI reporting is configured with a long transmission cycle and a UE does not receive the HS-PDSCH for an extended amount of time, the UE stops transmitting the HS-DPCCH for a number of TTI. Therefore, the DPCCCH2 is also not transmitted. Absence of the DPCCCH2 may lead to several complications, including:
The quality of the F-DPCCH1 that is transmitted by the serving HS-DSCH cell becomes unreliable since the TPC commands ordinarily carried by the DPCCCH2 are no longer available for the serving HS-DSCH cell during downlink transmission gaps. The unreliable F-DPCH1 quality may cause the UE to report out-of-sync status.
The power control for the DPCCH becomes unreliable since the power of the DPCCH is controlled according to a combination of the F-DPCCH1 from the serving HS-DSCH cell and the F-DPCH$_{NON-SERVING}$ from at least one of the non-serving HS-DSCH cells. Since F-DPCH1 is unreliable due to the absence of the TPC commands carried on the DPCCH2, the combination of the F-DPCCH1 and the F-DPCH$_{NON-SERVING}$ is also unreliable.

According to example embodiments, systems and methods are presented that solve the issues of the unreliable quality of the F-DPCCH1 transmitted by a serving HS-DSCH cell and unreliable power control for the DPCCH when the DPCCCH2 is not transmitted. The example embodiments may be implemented in heterogeneous or homogeneous communications systems, such as Universal Mobile Telecommunications System (UMTS), 3GPP LTE, IEEE 802.11, and so on, communications systems and devices, such as eNBs, NodeBs, base stations, LPNs, UEs, etc.

A UE may estimate the quality of the TPC fields of the F-DPCCH1 over a specified number of slots in which the TPC symbols are known to be present in order to potentially avoid reporting the CPHY-Out-of-Sync-IND primitive. When the DPCCCH2 is transmitted, the F-DPCH1 is transmitted by the serving HS-DSCH cell and the UE knows when the TPC symbols are present. When the DPCCCH2 is not transmitted, the UE will not attempt to estimate the F-DPCH1 quality (the quality of the TPC symbols) to derive the synchronization primitives. By doing so, unnecessary out-of-sync reporting may be prevented. However, the above discussed problem regarding the unreliability of power control for the DPCCH is not resolved.

According to an example embodiment, uplink power control and downlink synchronization in the presence of a secondary uplink pilot channel, e.g., in UMTS communications systems, are presented. The transmission pattern of the secondary uplink pilot channel impacts the uplink power control loop and the transmission of the downlink channels that carry TPC commands.

Under the assumption that a DPCCCH2 is not transmitted continuously, for example, the DPCCCH2 is transmitted only when a HS-DPCCH is transmitted, during a period when DPCCCH2 is not transmitted, a UE knows that TPC commands from the serving HS-DSCH cell may be unreliable. Therefore, the UE ignores the TPC commands included in the F-DPCCH1 and F-DPCCH2 transmitted by the serving HS-DSCH cell in downlink slots associated with uplink slots in which the DPCCCH2 is not transmitted. The UE combines received TPC commands from at least one non-serving HS-DSCH cell (i.e., the serving E-DCH cell) to control the power of the DPCCH.

If the TPC commands from the serving HS-DSCH cell are known to be unreliable (such as when the DPCCCH2 is not transmitted) the serving HS-DSCH cell may stop the transmission of the F-DPCCH1 and F-DPCCH2 to save transmission power at the serving HS-DSCH cell. The UE combines received TPC commands from at least one non-serving HS-DSCH cell to control the power of the DPCCH.

According to a first example embodiment, in a situation where the DPCCCH2 is only transmitted together with the HS-DPCCH, when the DPCCCH2 is not transmitted, the F-DPCH1 and F-DPCCH2 from the serving HS-DSCH cell would be unreliable, therefore the serving HS-DSCH cell and UE behaves as follows:

Serving HS-DSCH cell:
F-DPCCH1 is transmitted by the serving HS-DSCH cell; and F-DPCCH2 is transmitted by the serving HS-DSCH cell or F-DPCCH2 is NOT transmitted by the serving HS-DSCH cell; and UE:
The UE assumes that for a period of time the quality of the TPC commands on F-DPCCH1 is unreliable; and the UE only uses the TPC commands received from the non-serving HS-DSCH cells for TPC combining to control the power of the DPCCH; and
Alternatively, the UE assumes the TPC commands on the F-DPCCH1 are always +1 and uses them together with the TPC commands received from the non-serving HS-DSCH cells for TPC combining to control the power of the DPCCH.

According to a second example embodiment, in a situation where the DPCCCH2 is only transmitted together with the HS-DPCCH, when the DPCCCH2 is not transmitted, the F-DPCH1 and F-DPCCH2 from the serving HS-DSCH cell would be unreliable, therefore the serving HS-DSCH cell and UE behave as follows:

Serving HS-DSCH cell:
F-DPCCH1 is NOT transmitted by the serving HS-DSCH cell in downlink slots associated with uplink slots in which HS-DPCCH or DPCCCH2 is not transmitted; and
F-DPCCH2 is transmitted by serving HS-DSCH cell or F-DPCCH2 is NOT transmitted by the serving HS-DSCH cell; and UE:
The UE assumes that for a period of time the quality of the TPC commands on F-DPCCH1 is unreliable; and the UE only uses the TPC commands received from the non-serving HS-DSCH cells for TPC combining to control the power of the DPCCH.

According to a third example embodiment, in a situation when the DPCCCH2 is only transmitted with the HS-DPCCH, the serving HS-DSCH cell and UE behaves as follows:

Serving HS-DSCH cell:
F-DPCCH1 is not transmitted; and

UE:
The UE determines the uplink transmit power of the DPCCCH2 according to the TPC command conveyed by the F-DPCCH2 transmitted by the serving HS-DSCH cell; and
The UE determines the uplink transmit power of the DPCCH according to the TPC command conveyed by the F-DPCH$_{NON\text{-}SERVING}$ transmitted by at least one non-serving HS-DSCH cell.

Figure 4A:
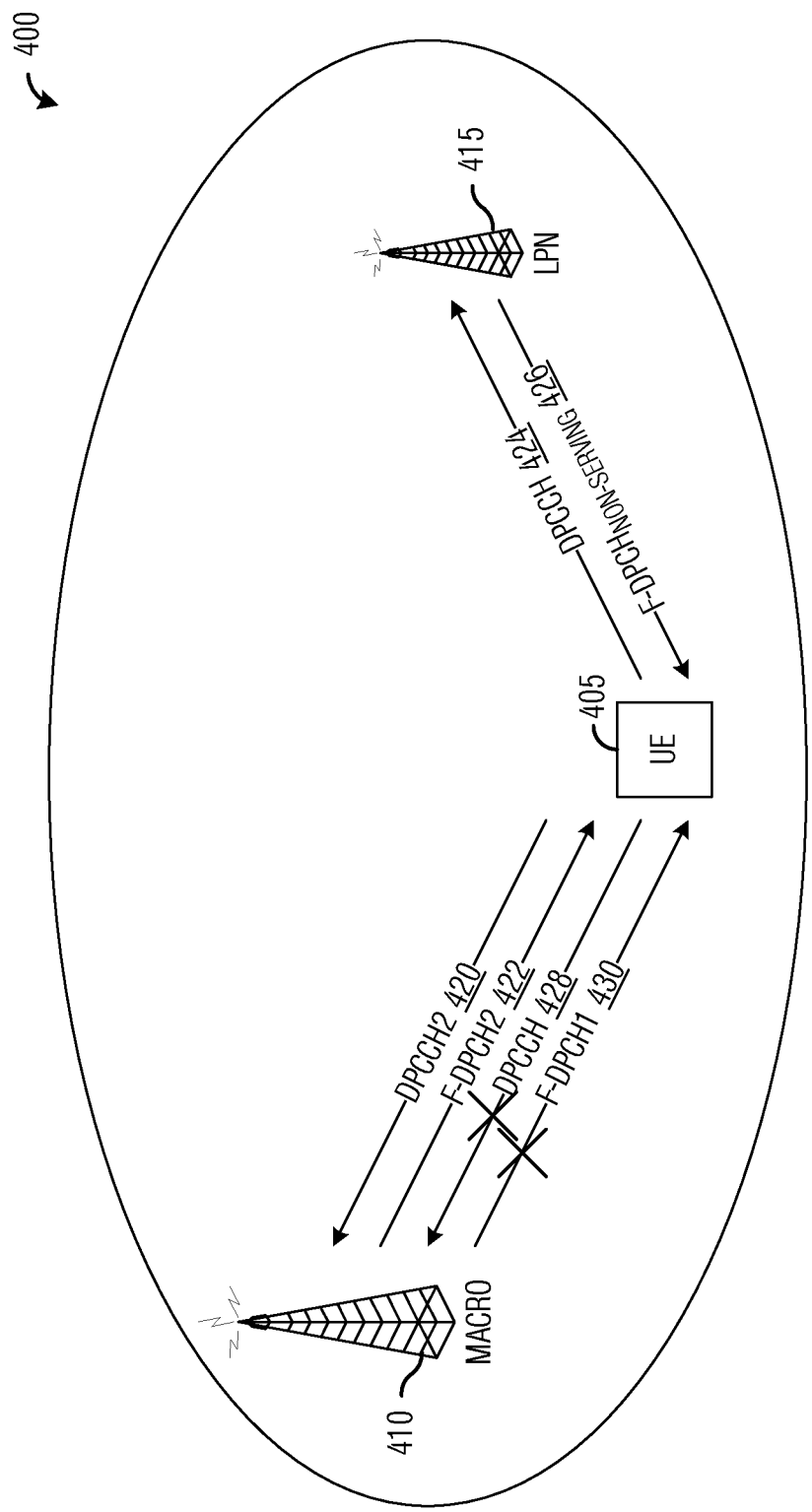
FIG. 4A illustrates a communications system highlighting control signals present in a situation as described by the third example embodiment according to example embodiments described herein.
Figure 4B:
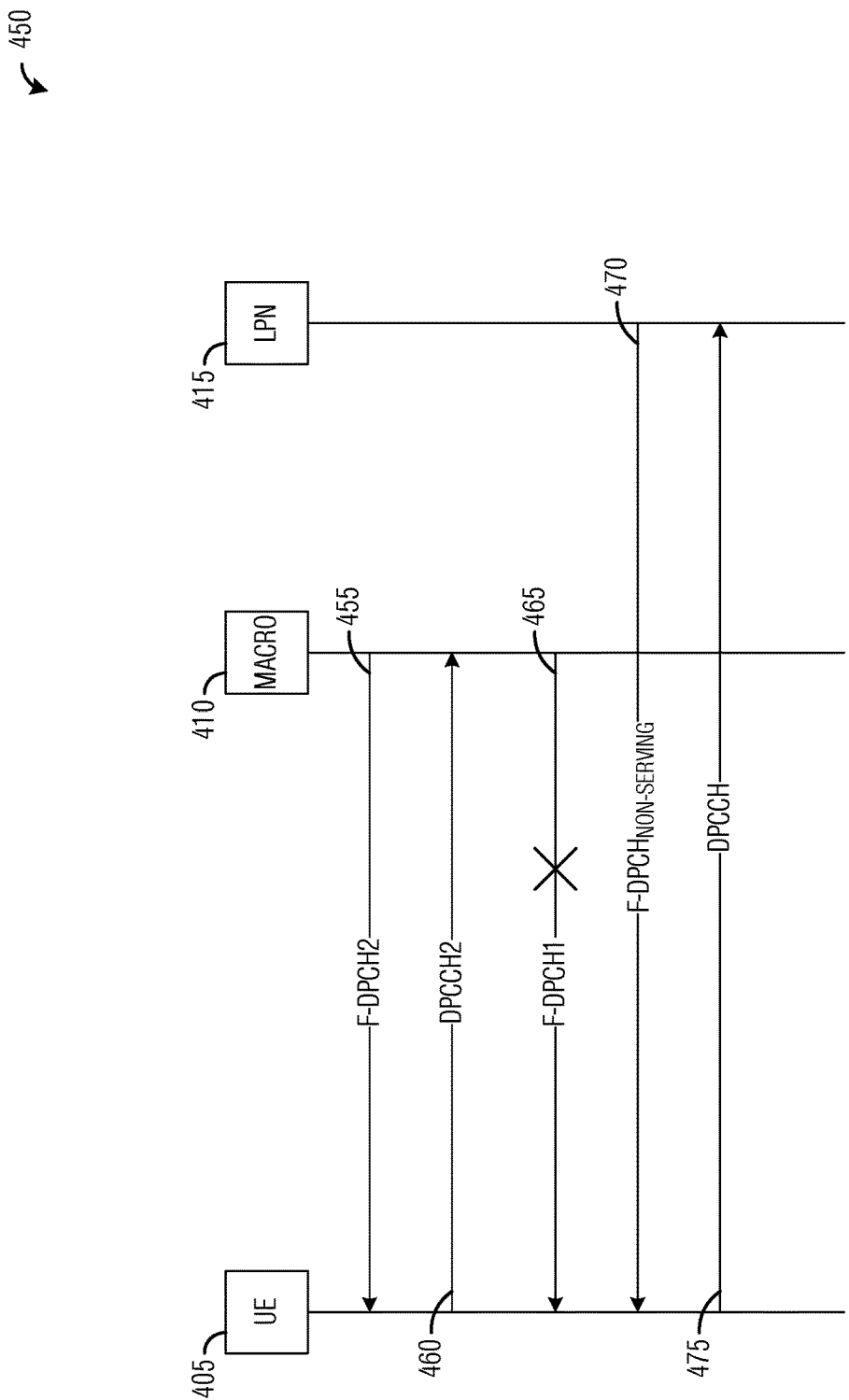
FIG. 4B illustrates a message exchange diagram occurring in a situation as described by the third example embodiment according to example embodiments described herein.

FIG. 4A illustrates a communications system 400 highlighting control signals present in a situation as described by the third example embodiment. Communications system 400 includes a UE 405, a macro node 410, and a LPN 415. As shown in FIG. 4A, macro node 410 is operating as a serving HS-DSCH cell for UE 405 and LPN 415 is operating as a non-serving HS-DSCH cell for UE 405. Control channels include: DPCCCH2 420, F-DPCCH2 422, DPCCH 424 from UE 405 to LPN 415, and F-DPCH$_{NON\text{-}SERVING}$ 426. Control channels DPCCH 428 from UE 405 to macro node 410 and F-DPCCH1 430 are not present. FIG. 4B illustrates a message exchange diagram 450 occurring in a situation as described by the third example embodiment. Message exchange diagram 450 displays control channels exchanged between UE 405, macro node 410, and LPN 415. Control channels exchanged between UE 405, macro node 410, and LPN 415 may include a F-DPCCH2 (shown as event 455), a DPCCCH2 (shown as event 460), a F-DPCH$_{NON\text{-}SERVING}$ (shown as event 470) and a DPCCH between UE 405 and LPN 415 (shown as event 475). Control channel F-DPCCH1 is absent (shown as crossed out event 465).

According to a fourth example embodiment, in a situation when the DPCCCH2 is only transmitted with the HS-DPCCH, the serving HS-DSCH cell and the UE behaves as follows:

Serving HS-DSCH cell:
F-DPCCH1 is transmitted when F-DPCCH2 is transmitted. The TPC commands conveyed by F-DPCCH1 are identical to the TPC commands conveyed by F-DPCH2; and UE:
The UE determines the uplink transmit power of DPCCCH2 according to the TPC commands conveyed by F-DPCCH1 and/or F-DPCCH2 from the serving HS-DSCH cell, e.g., through a soft combining of the received TPC commands from F-DPCCH1 and/or F-DPCH2; and
The UE determines the uplink transmit power of DPCCH according to the TPC commands conveyed by F-DPCH$_{NON\text{-}SERVING}$ from the at least one non-serving HS-DSCH cell.

According to a fifth example embodiment, in a situation when the DPCCCH2 is transmitted only with the HS-PDCCH, the serving HS-DSCH cell and the UE behaves as follows:

Serving HS-DSCH cell:
F-DPCCH1 is power controlled by the TPC conveyed by the DPCCH;
F-DPCCH2 is power controlled by the TPC conveyed on the DPCCH2; and UE:
The UE determines the uplink transmit power of DPCCCH2 according to the TPC commands conveyed by F-DPCCH2 from the serving HS-DSCH cell;
The UE determines the uplink transmit power of DPCCH according to a combination of the TPC commands conveyed by F-DPCCH1 from serving HS-DSCH cell and F-DPCH$_{NON\text{-}SERVING}$ from non-serving HS-DSCH cell; and
For the TPC commands conveyed by PDCCH in the uplink, the UE considers both the F-DPCH$_{NON\text{-}SERVING}$ from non-serving HS-DSCH cell and F-DPCCH1 from serving HS-DSCH cell, meaning that the TPC commands on the DPCCH should guarantee both the reliability of F-DPCCH1 and F-DPCH$_{NON\text{-}SERVING}$. By doing this, the reliability of F-DPCH1 generally can be guaranteed even though the DPCCCH2 is not transmitted. The DPCCCH2 power control loop and DPCCH power control loop are isolated from each other.

Figure 5A:
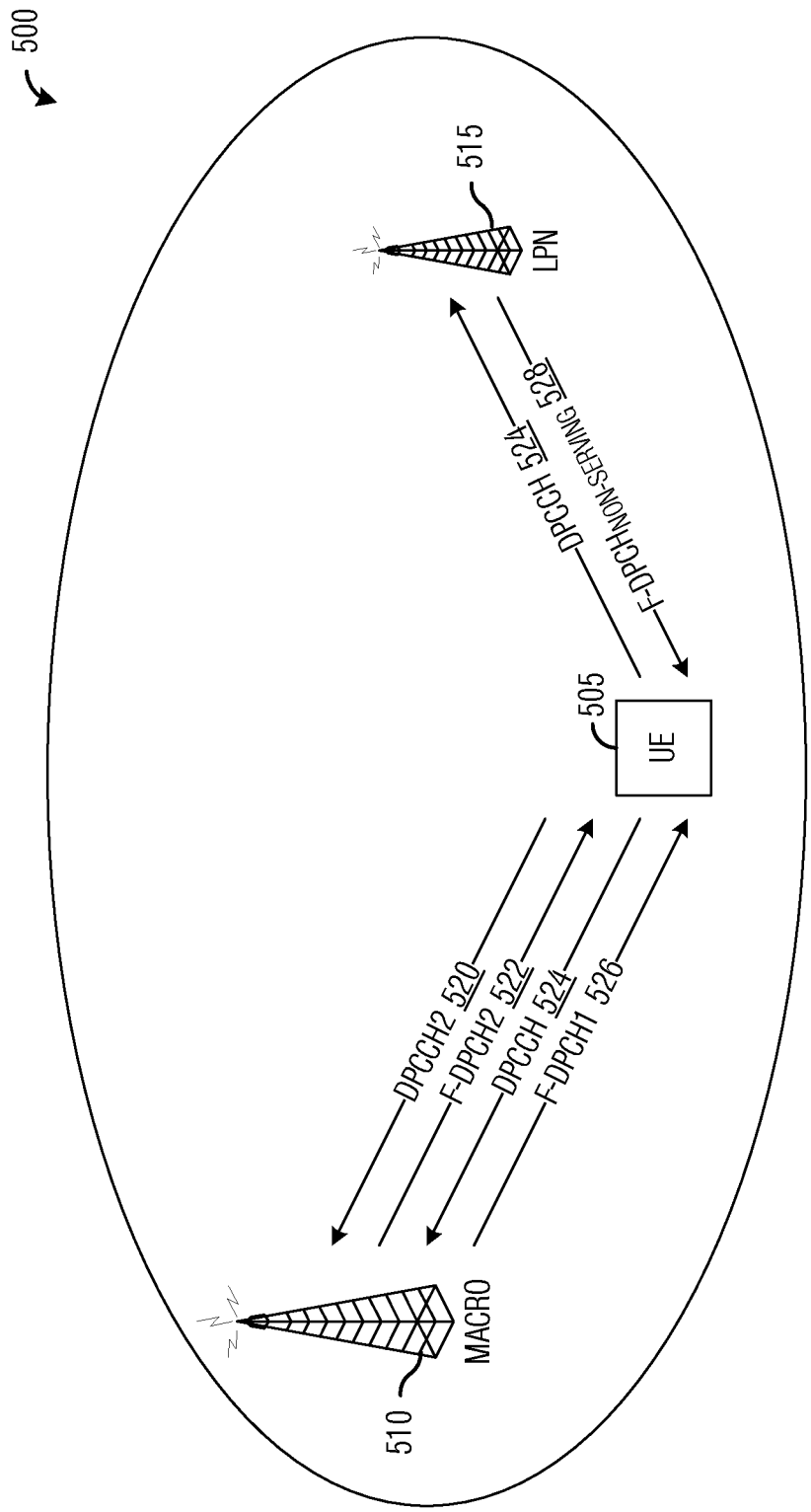
FIG. 5A illustrates a communications system highlighting control signals present in a situation as described by the fifth example embodiment according to example embodiments described herein.
Figure 5B:
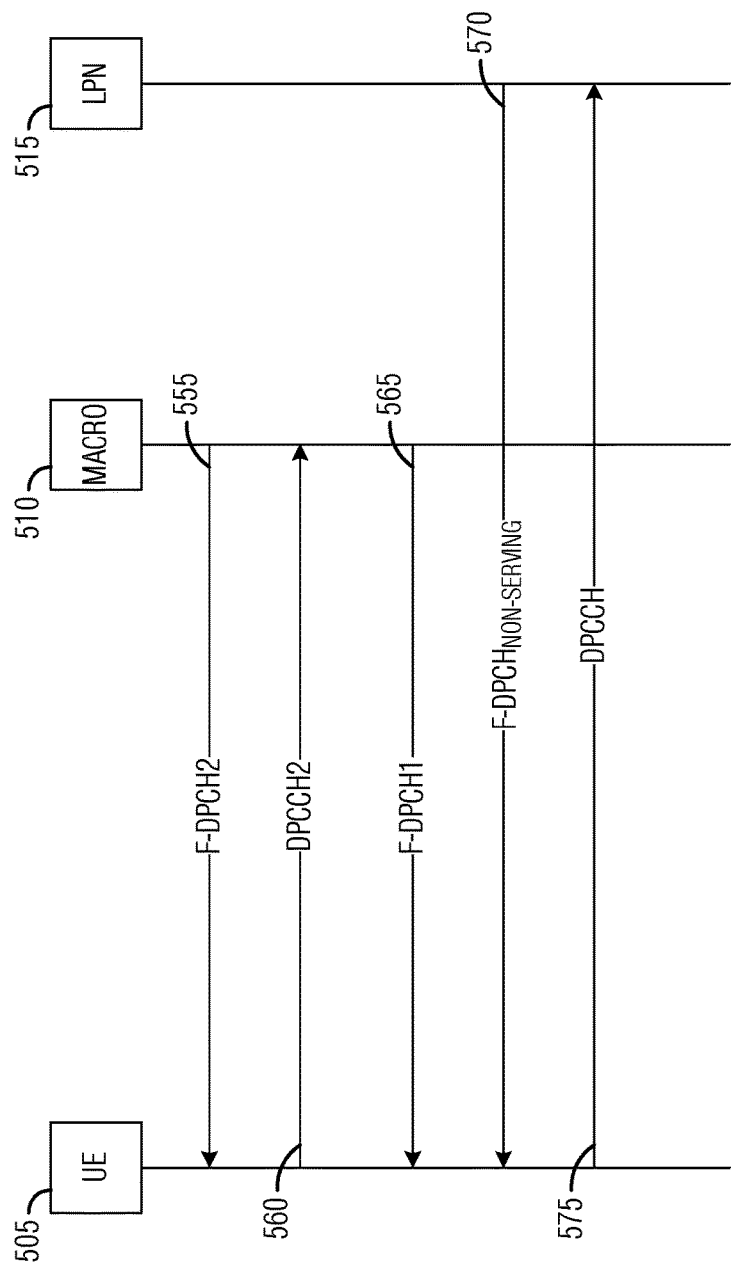
FIG. 5B illustrates a message exchange diagram occurring in a situation as described by the fifth example embodiment according to example embodiments described herein.

FIG. 5A illustrates a communications system 500 highlighting control signals present in a situation as described by the fifth example embodiment. Communications system 500 includes a UE 505, a macro node 510, and a LPN 515. As shown in FIG. 5A, macro node 510 is operating as a serving HS-DSCH cell for UE 505 and LPN 515 is operating as a non-serving HS-DSCH cell for UE 505. Control channels include: DPCCCH2 520, F-DPCCH2 522, F-DPCH1 526, DPCCH 524, and F-DPCH$_{NON\text{-}SERVING}$ 528. FIG. 5B illustrates a message exchange diagram 550 occurring in a situation as described by the fifth example embodiment. Message exchange diagram 550 displays control channels exchanged between UE 505, macro node 510, and LPN 515. Control channels exchanged between UE 505, macro node 510, and LPN 515 may include a F-DPCCH2 (shown as event 555), a DPCCCH2 (shown as event 560), a F-DPCCH1 (shown as event 565), a F-DPCH$_{NON\text{-}SERVING}$ (shown as event 570) and a DPCCH between UE 505 and LPN 515 (shown as event 575).

According to a sixth example embodiment, a plurality of possible configurations for the transmission of the F-DPCCH1 by the serving HS-DSCH cell and the combining of the TPC commands by the UE are specified and the serving HS-DSCH cell and the UE are able to switch between different configurations. Examples of possible configurations include those disclosed in the first through fifth example embodiments.

The switching between different configurations may be explicitly triggered or implicitly triggered. As an illustrative example, in explicit triggering of configuration switching, higher layer signaling (such as radio resource control (RRC) signaling, for example) is sent from the communications system to the UE to instruct the UE to switch to a different configuration. Alternatively, physical (PHY) layer signaling (e.g., a HS-shared control channel (HS-SCCH) order) may be sent from the communications system to the UE to instruct the UE to switch to a different configuration. As an illustrative example, in implicit triggering of configuration switching, at least one parameter may be determined as a threshold to trigger the configuration switching. For example, the length of the CQI cycle is set as the metric, and if the length of the CQI cycle is greater than a specified threshold, the UE switches to a different configuration. The specified threshold may be signaled by the network using higher layer signaling, PHY layer signaling, or it may be predetermined by the communications system and the UE.

According to a seventh example embodiment, in a situation where the DPCCCH2 is not continuously transmitted and the F-DPCCH1 is always transmitted by serving HS-DSCH cell, the UE behaves as follows:

In a first option, the UE derives the downlink synchronization primitives from the estimated quality of F-DPCCH1 from the serving HS-DSCH cell over a previous certain number of slots in which F-DPCCH1 transmission is associated with DPCCCH2 transmission. The UE derives the downlink synchronization primitives from the estimated quality of the F-DPCCH1 from the serving HS-DSCH cell over the previous certain number of slots and DPCCCH2 is not transmitted.

In a second option, the UE derives the downlink synchronization primitives from the estimated quality of F-DPCCH1 from the serving HS-DSCH cell and F-DPCH-$_{NON\text{-}SERVING}$ from the non-serving HS-DSCH cell over the previous certain number of slots in which F-DPCH1 transmission is associated with DPCCCH2 transmission. The UE derives the downlink synchronization primitives from the estimated quality of F-DPCCH1 from the serving HS-DSCH cell and F-DPCH$_{NON\text{-}SERVING}$ from the non-serving HS-DSCH cell over the previous certain number of slots and DPCCCH2 is not transmitted.

In a third option, the UE derives the downlink synchronization primitives from the estimated quality of F-DPCH$_{NON\text{-}SERVING}$ from the non-serving HS-DSCH cell over the previous certain number of slots in which F-DPCCH1 transmission is associated with DPCCH2 transmission. The UE derives the downlink synchronization primitives from the estimated quality of F-DPCCH1 from the non-serving HS-DSCH cell over the previous certain number of slots and DPCCCH2 is not transmitted.

According to an eighth example embodiment, in a situation where the DPCCCH2 is not continuously transmitted and the F-DPCCH1 is only transmitted when an associated DPCCCH2 is transmitted, the UE behaves as follows:

In a first option, the UE derives the downlink synchronization primitives from the estimated quality of F-DPCCH1 from the serving HS-DSCH cell over a certain number of slots in which the F-DPCCH1 is known to be present.

In a second option, the UE derives the downlink synchronization primitives from the estimated quality of F-DPCCH1 from the serving HS-DSCH cell and F-DPCH-$_{NON\text{-}SERVING}$ from the non-serving HS-DSCH cell over a certain number of slots in which the F-DPCCH1 is known to be present.

In a third option, the UE derives the downlink synchronization primitives from the estimated quality of F-DPCH$_{NON\text{-}SERVING}$ from the non-serving HS-DSCH cell over a certain number of slots in which the F-DPCCH1 is known to be present.

Figure 6:
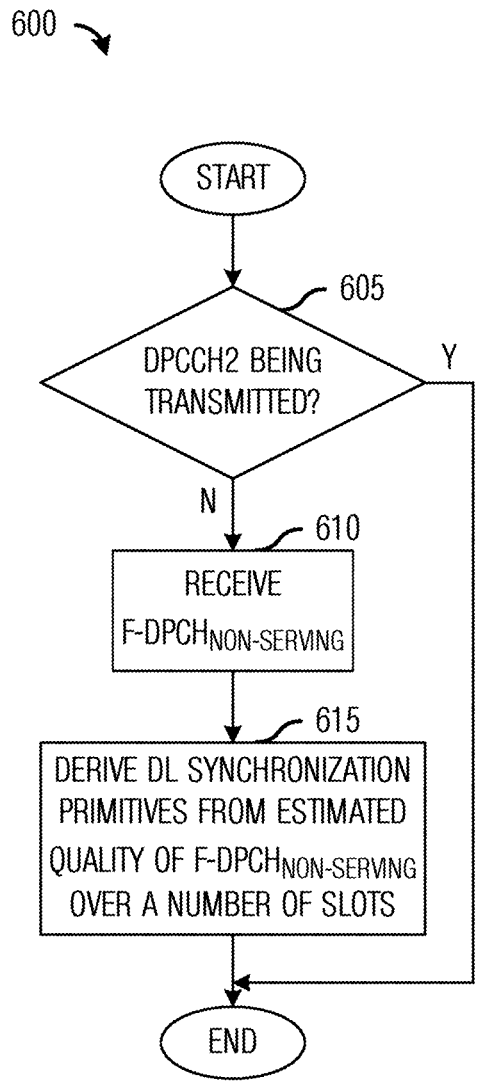
FIG. 6 illustrates a flow diagram of example operations occurring in a UE deriving downlink synchronization primitives according to example embodiments described herein.

FIG. 6 illustrates a flow diagram of example operations 600 occurring in a UE deriving downlink synchronization primitives. Operations 600 may be indicative of operations occurring in a UE served by a serving HS-DSCH cell and a non-serving HS-DSCH cell as the UE derives downlink synchronization primitives in a situation where the DPCCCH2 is not transmitted.

Operations 600 may begin with the UE performing a check to determine if the DPCCCH2 is being transmitted (block 605). If the DPCCCH2 is not being transmitted, the UE receives the F-DPCH$_{NON\text{-}SERVING}$ transmitted by the non-serving HS-DSCH cell (block 610). The UE derives the downlink synchronization primitives from the quality (estimated quality) of the F-DPCH$_{NON\text{-}SERVING}$ transmitted by the non-serving HS-DSCH cell over a certain number of slots (block 615). The number of slots over which the UE uses to derive the downlink synchronization primitives may be specified by a technical standard or an operator of the communications system. The UE may also use the quality of the F-DPCCH1 transmitted by the serving HS-DSCH cell over the certain number of slots to derive the downlink synchronization primitives. If there are a plurality of non-serving HS-DSCH cells, the UE may use the quality of a subset of all of F-DPCH$_{NON\text{-}SERVING}$ transmitted by the plurality of non-serving HS-DSCH cells over the certain number of slots to derive the downlink synchronization primitives.

In block 605, if the DPCCCH2 is being transmitted, blocks 610 and 615 are bypassed. Instead, the UE may use the TPC fields of the F-DPCCH1 to derive the downlink synchronization primitives.

Figure 7:
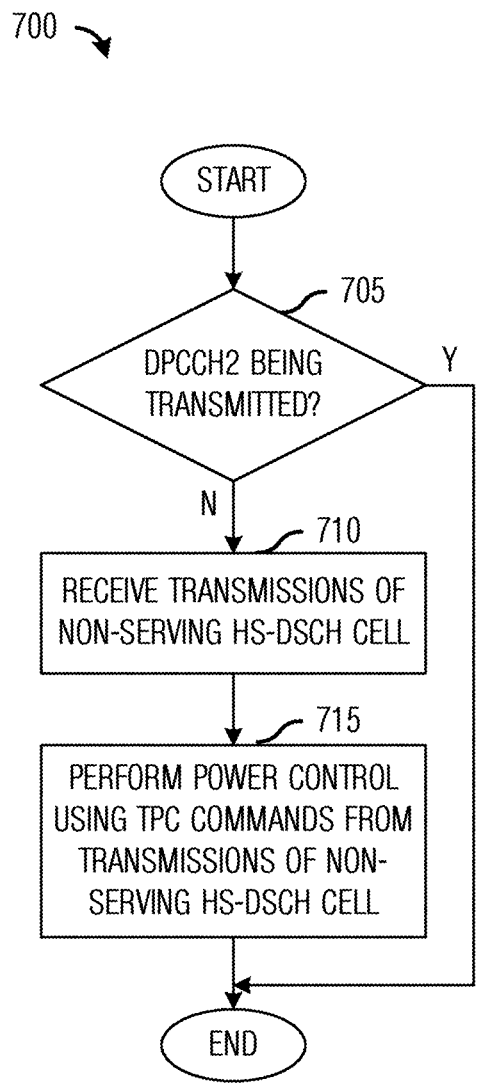
FIG. 7 illustrates a flow diagram of example operations occurring in a UE performing power control for a DPCCH according to example embodiments described herein.

FIG. 7 illustrates a flow diagram of example operations 700 occurring in a UE performing power control for a DPCCH. Operations 700 may be indicative of operations occurring in a UE served by a serving HS-DSCH cell and a non-serving HS-DSCH cell as the UE performs power control for a DPCCH.

Operations 700 may begin with the UE performing a check to determine if the DPCCCH2 is being transmitted (block 705). If the DPCCCH2 is not being transmitted, the UE receives TPC commands transmitted by at least one non-serving HS-DSCH cell (block 710). The UE performs power control using received TPC commands transmitted by the at least one non-serving HS-DSCH cell (block 715). The UE may also set any TPC commands transmitted by the serving HS-DSCH cell to a specified value, such as +1, and combine them with TPC commands transmitted by the at least one non-serving HS-DSCH cell to perform power control. The UE may use TPC commands transmitted by the serving HS-DSCH cell on an alternate fractional control channel to perform power control. The UE may use TPC commands from a plurality of fractional control channels transmitted by the serving HS-DSCH cell to perform power control. The UE may use TPC commands from a fractional control channel transmitted by the serving HS-DSCH cell and a control channel transmitted by the non-serving HS-DSCH cell (potentially more than one) to perform power control. The way in which the UE performs power control may be changed through an explicit trigger or an implicit trigger.

In block 705, if the DPCCCH2 is being transmitted, blocks 710 and 715 are bypassed. Instead, the UE may use the TPC commands of the F-DPCCH1 to perform power control.

Figure 8:
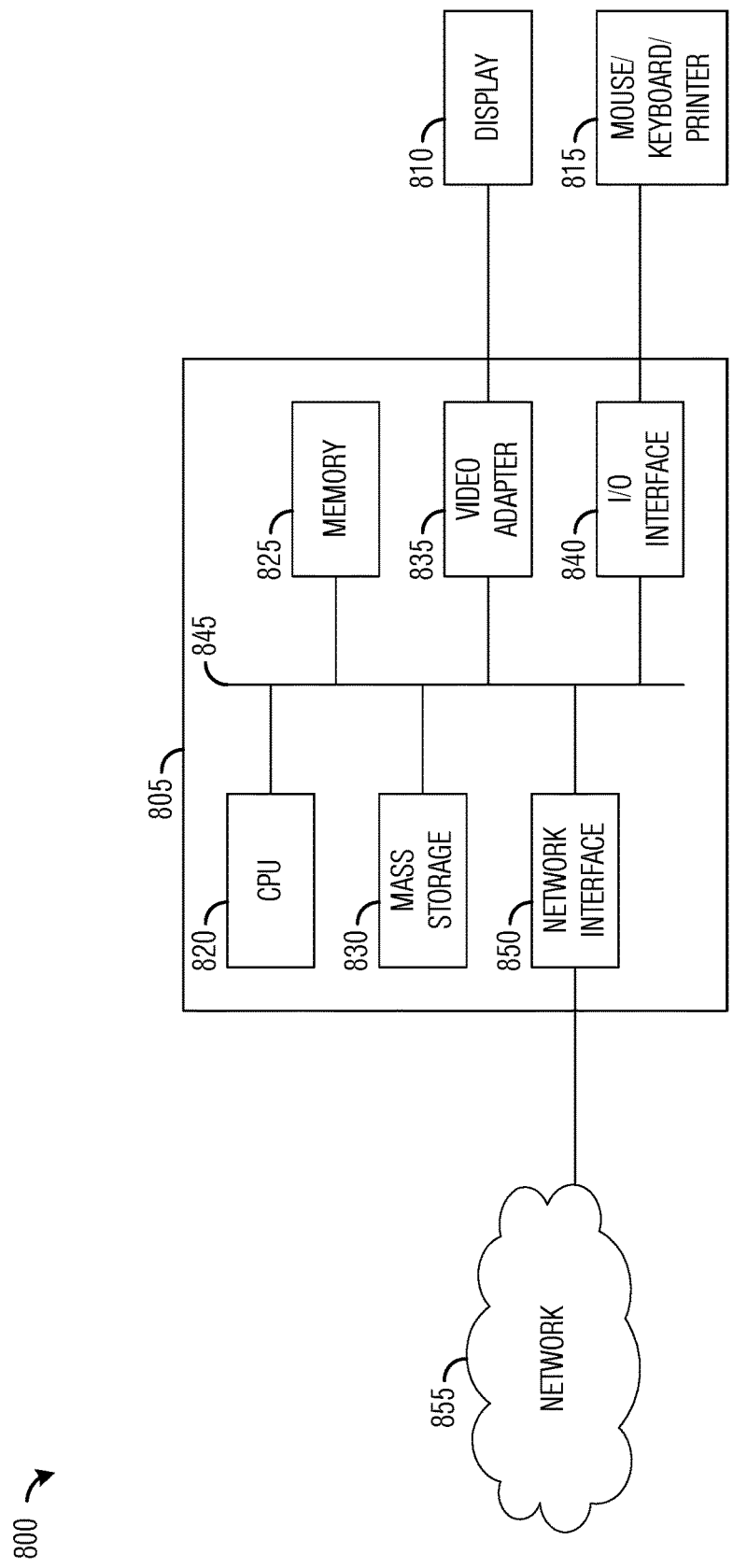
FIG. 8 is a block diagram of a processing system that may be used for implementing the devices and methods disclosed herein.

FIG. 8 is a block diagram of a processing system 800 that may be used for implementing the devices and methods disclosed herein. In some embodiments, the processing system 800 comprises a UE. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 805 equipped with one or more input/output devices, such as a human interface 815 (including speaker, microphone, mouse, touchscreen, keypad, keyboard, printer, and the like), display 810, and so on. The processing unit may include a central processing unit (CPU) 820, memory 825, a mass storage device 830, a video adapter 835, and an I/O interface 840 connected to a bus 845.

The bus 845 may be one or more of any type of several bus architectures including a memory bus or memory controller, a peripheral bus, video bus, or the like. The CPU 820 may comprise any type of electronic data processor. The memory 825 may comprise any type of system memory such as static random access memory (SRAM), dynamic random access memory (DRAM), synchronous DRAM (SDRAM), read-only memory (ROM), a combination thereof, or the like. In an embodiment, the memory 825 may include ROM for use at boot-up, and DRAM for program and data storage for use while executing programs.

The mass storage device 830 may comprise any type of storage device configured to store data, programs, and other information and to make the data, programs, and other information accessible via the bus 845. The mass storage device 830 may comprise, for example, one or more of a solid state drive, hard disk drive, a magnetic disk drive, an optical disk drive, or the like.

The video adapter 835 and the I/O interface 840 provide interfaces to couple external input and output devices to the processing unit 800. As illustrated, examples of input and output devices include the display 810 coupled to the video adapter 835 and the mouse/keyboard/printer 815 coupled to the I/O interface 840. Other devices may be coupled to the processing unit 800, and additional or fewer interface devices may be utilized. For example, a serial interface such as Universal Serial Bus (USB) (not shown) may be used to provide an interface for a printer.

The processing unit 800 also includes one or more network interfaces 850, which may comprise wired links, such as an Ethernet cable or the like, and/or wireless links to access nodes or different networks 855. The network interface 850 allows the processing unit 800 to communicate with remote units via the networks 855. For example, the network interface 850 may provide wireless communication via one or more transmitters/transmit antennas and one or more receivers/receive antennas. In an embodiment, the processing unit 800 is coupled to a local-area network or a wide-area network 855 for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

What is claimed is:

1. A method for operating a user equipment (UE) configured for estimating channel quality, the method comprising:
   receiving, by the UE, a downlink fractional control channel from a non-serving cell;
   estimating, by the UE, a quality of the downlink fractional control channel from the non-serving cell over a specified time period; and
   deriving, by the UE, downlink synchronization primitives in accordance with the quality of the downlink fractional control channel from the non-serving cell.

2. The method of claim 1, the downlink fractional control channel comprising a fractional dedicated physical channel (F-DPCH$_{NON\text{-}SERVING}$), and an uplink physical control channel comprising a secondary dedicated physical control channel (DPCCH2).

3. The method of claim 1, the downlink synchronization primitives comprising at least one of a CPHY-Sync-IND, a CPHY-Out-of-Sync-IND, or a combination thereof.

4. The method of claim 1, the non-serving cell comprising one of a non-serving high-speed downlink shared channel (HS-DSCH) cell, or a serving enhanced dedicated channel (E-DCH) cell when E-DCH decoupling is configured.

5. The method of claim 1, the estimating the quality of the downlink fractional control channel comprising estimating a quality of transmit power control (TPC) fields in the downlink fractional control channel.

6. A method for operating a user equipment (UE) configured for performing transmit power control (TPC), the method comprising:
   receiving, by the UE, a first downlink fractional control channel from a serving high-speed downlink shared channel (HS-DSCH) cell and a downlink fractional control channel from a non-serving HS-DSCH cell; and
   determining, by the UE during a gap in which an uplink dedicated physical control channel (DPCCH) is not transmitted, a transmit power of the uplink DPCCH in accordance with TPC fields in the downlink fractional control channel from the non-serving HS-DSCH cell.

7. The method of claim 6, further comprising the UE setting the TPC fields in the first downlink fractional control channel from the serving HS-DSCH cell to a +1 value.

8. The method of claim 6, further comprising:
   receiving a second downlink fractional control channel from the serving HS-DSCH cell; and
   determining a transmit power of an uplink secondary dedicated physical control channel (DPCCH2) in accordance with TPC fields in the first and second downlink fractional control channels from the serving HS-DSCH cell.

9. The method of claim 6, further comprising determining a TPC command carried by the uplink DPCCH in accordance with TPC fields in the first downlink fractional control channel from the serving HS-DSCH cell and the TPC fields in the downlink fractional control channel from the non-serving HS-DSCH cell.

10. The method of claim 6, the first downlink fractional control channel from the serving HS-DSCH cell being a F-DPCH1 and the downlink fractional control channel from the non-serving HS-DSCH cell being a F-DPCH$_{NON\text{-}SERVING}$.

11. A user equipment (UE) configured to perform transmit power control (TPC), the UE comprising:
a non-transitory memory storage comprising instructions; and
one or more processors in communication with the memory storage, wherein the one or more processors execute the instructions to:
determine a transmit power of an uplink dedicated physical control channel (DPCCH) in accordance with a first combination of TPC fields from at least one of a first downlink fractional control channel from a serving high-speed downlink shared channel (HS-DSCH) cell, a second downlink fractional control channel from the serving HS-DSCH cell, or a downlink fractional control channel from a non-serving HS-DSCH cell;
receive signaling indicating a switch in how the transmit power of the uplink DPCCH is determined; and
determine the transmit power of the uplink DPCCH in accordance with a second combination of the TPC fields from at least one of the first downlink fractional control channel from the serving HS-DSCH cell, the second downlink fractional control channel from the serving HS-DSCH cell, or the downlink fractional control channel from the non-serving HS-DSCH cell.

12. The UE of claim 11, wherein the one or more processors execute the instructions to receive the signaling comprises the one or more processors executing the instructions to receive the signaling in a physical channel from the serving HS-DSCH cell.

13. The UE of claim 11, wherein the signaling is Radio Resource Control (RRC) signaling.

14. A user equipment (UE) configured to estimate channel quality, the UE comprising:
a non-transitory memory storage comprising instructions; and
one or more processors in communication with the memory storage, wherein the one or more processors execute the instructions to:
receive a downlink fractional control channel from a non-serving cell;
estimate a quality of the downlink fractional control channel from the non-serving cell over a specified time period; and
derive downlink synchronization primitives in accordance with the quality of the downlink fractional control channel from the non-serving cell.

15. The UE of claim 14, wherein the downlink fractional control channel comprises a fractional dedicated physical channel (F-DPCH$_{NON\text{-}SERVING}$), and wherein an uplink physical control channel comprises a secondary dedicated physical control channel (DPCCH2).

16. The UE of claim 14, wherein the downlink synchronization primitives comprise at least one of a CPHY-Sync-IND, a CPHY-Out-of-Sync-IND, or a combination thereof.

17. The UE of claim 14, wherein the non-serving cell comprises one of a non-serving high-speed downlink shared channel (HS-DSCH) cell, or a serving enhanced dedicated channel (E-DCH) cell when E-DCH decoupling is configured.

18. The UE of claim 14, wherein the one or more processors execute the instructions to estimate a quality of transmit power control (TPC) fields in the downlink fractional control channel.

19. A user equipment (UE) configured to perform transmit power control (TPC), the UE comprising:
a non-transitory memory storage comprising instructions; and
one or more processors in communication with the memory storage, wherein the one or more processors execute the instructions to:
receive a first downlink fractional control channel from a serving high-speed downlink shared channel (HS-DSCH) cell and a downlink fractional control channel from a non-serving HS-DSCH cell; and
determine, during a gap in which an uplink dedicated physical control channel (DPCCH) is not transmitted, a transmit power of the uplink DPCCH in accordance with TPC fields in the downlink fractional control channel from the non-serving HS-DSCH cell.

20. The UE of claim 19, wherein the one or more processors execute the instructions to set the TPC fields in the first downlink fractional control channel from the serving HS-DSCH cell to a +1 value.

21. The UE of claim 19, wherein the one or more processors execute the instructions to:
receive a second downlink fractional control channel from the serving HS-DSCH cell, and
determine a transmit power of an uplink secondary dedicated physical control channel (DPCCH2) in accordance with TPC fields in the first and second downlink fractional control channel from the serving HS-DSCH cell.

22. The UE of claim 19, wherein the one or more processors execute the instructions to determine a TPC command carried by the uplink DPCCH in accordance with TPC fields in the first downlink fractional control channel from the serving HS-DSCH cell and the TPC fields in the downlink fractional control channel from the non-serving HS-DSCH cell.

23. The UE of claim 19, wherein the first downlink fractional control channel from the serving HS-DSCH cell is a F-DPCH1 and the downlink fractional control channel from the non-serving HS-DSCH cell is a F-DPCH$_{NON\text{-}SERVING}$.

* * * * *